UNITED STATES PATENT OFFICE.

ADOLF HEINEMANN, OF EBERSWALDE, GERMANY.

PROCESS OF EXTRACTING ELLAGIC ACID.

SPECIFICATION forming part of Letters Patent No. 706,411, dated August 5, 1902.

Application filed October 26, 1901. Serial No. 80,123. (Specimens.)

*To all whom it may concern:*

Be it known that I, ADOLF HEINEMANN, Ph. D., of Eberswalde, in the Kingdom of Prussia and Empire of Germany, have invented certain new and useful Improvements in Processes of Extracting Ellagic Acid from Tanning Materials Containing the Same, of which the following is a specification.

It has been known for some time that ellagic acid ($C_{14}H_6O_8 + 2H_2O$) is found in divi-divi, algarrobilla, and similar tanning materials. The processes heretofore used for obtaining it from these crude materials were very deficient and did not meet the requirements of a technical process adapted for practical use. Barth and Goldschmidt (*Berichte der Chemischen Ges.*, Vol. XI, page 846) have produced ellagic acid from divi-divi by treating the crushed husks with alcohol at ordinary temperature. Any process which is based on the extraction of ellagic acid by means of alcohol is, however, of little practical value on account of the very slight solubility of the acid in alcohol. Cobenzl (*Monatshefte für Chemie*, 1, 671) recommends that the crushed and pulverized husks should be heated with water for several days and the extract evaporated while adding sulfuric acid until a syrup results. To this syrup is added boiling water, from which the acid is precipitated. By this process, however, not all the acid contained in the husks can be obtained, as I have found that only a part of the acid is present in a free soluble form in the crude material. A considerable quantity of the acid is present in combination with other substances, probably as a glucoside, which is insoluble in water. The process proposed by Cobenzl has, however, the very important disadvantage that sulfuric acid has to be added to the extract and that the extract filtered off from the ellagic acid is of no value. Lastly, it is impractical and uneconomical to evaporate the extract first to a syrup and then to add boiling water to this syrup.

I have discovered the important fact that the ellagic acid contained in a diluted tanning extract is present in the amorphous state and becomes crystalline when the extract is evaporated to a specific gravity of 1.2. It is, furthermore, insoluble in an aqueous solution of the specific gravity of 1.2. These two observations permit the separation of all the ellagic acid that is present in an extract of the specific gravity of 1.2 by means of filtration, suction, or centrifugal force. The production of ellagic acid from a more concentrated extract is more difficult, requires more time, and gives an impure product.

My invention consists, therefore, of a process of producing ellagic acid from tanning materials containing it by concentrating the extract of the crude materials to a specific gravity of 1.2 and then separating the crystalline acid from this extract in any suitable manner.

To practically carry out my improved process, the crude material is extracted by means of boiling water. The extract is then drawn off from the husks and evaporated to a specific gravity of 1.2. The ellagic acid is deposited in crystalline form and is separated from the mother-liquor by filtration, suction, or centrifugal force. The remaining extracted husks are heated with dilute sulfuric or other acid, which latter is then filtered off. The ellagic acid still contained in the extracted husks is set free by this inversion and obtained from the residue by treatment of the latter with sodium hydrate and ammonium chlorid, following the process described in German Patent No. 123,128.

Having thus described my invention, I claim as new and desire to secure by Letters Patent—

1. The process herein described of producing ellagic acid from tanning materials containing it, which consists in concentrating an aqueous extract of the crude tanning substances to a specific gravity of 1.2, and then separating the crystalline and insoluble ellagic acid from said extract, substantially as set forth.

2. The process herein described of producing ellagic acid from tanning materials containing it, which consists in concentrating an aqueous extract of the crude tanning substances to a specific gravity of 1.2, separating therefrom the crystalline insoluble ellagic acid, inverting the ellagic-acid compound contained in the extracted husks by boiling them with a suitable acid, filtering off the acid, and
5 separating the ellagic acid set free by the inversion from the residue.

In testimony that I claim the foregoing as my invention I have signed my name in presence of two subscribing witnesses.

ADOLF HEINEMANN.

Witnesses:
  L. OTTEMANN,
  CONRAD PALM.